(12) United States Patent
Bezian et al.

(10) Patent No.: US 7,195,573 B2
(45) Date of Patent: Mar. 27, 2007

(54) POWER TRANSMISSION DEVICE WITH AT LEAST TWO PLANETARY GEAR TRAINS

(75) Inventors: Alain Bezian, Rueil Malmaison (FR); Jacques Laeuffer, Paris (FR)

(73) Assignee: Peugeot Citroen Automobiles SA, Villacoublay (FR)

( * ) Notice: Subject to any disclaimer, the term of this patent is extended or adjusted under 35 U.S.C. 154(b) by 161 days.

(21) Appl. No.: 10/496,597

(22) PCT Filed: Nov. 21, 2002

(86) PCT No.: PCT/FR02/03991

§ 371 (c)(1),
(2), (4) Date: May 21, 2004

(87) PCT Pub. No.: WO03/043846

PCT Pub. Date: May 30, 2003

(65) Prior Publication Data

US 2005/0064974 A1    Mar. 24, 2005

(30) Foreign Application Priority Data

Nov. 21, 2001    (FR) .................................. 01 15050

(51) Int. Cl.
*F16H 3/72*    (2006.01)

(52) U.S. Cl. ...................................................... 475/5

(58) Field of Classification Search ................... 475/5; 477/5

See application file for complete search history.

(56) References Cited

U.S. PATENT DOCUMENTS 6,945,894 B2 *   9/2005   Holmes .......................... 475/5
6,962,545 B2 *  11/2005   Larkin ........................... 475/5

* cited by examiner

*Primary Examiner*—Dirk Wright
(74) *Attorney, Agent, or Firm*—Blakely Sokoloff Taylor & Zafman

(57) ABSTRACT

The invention concerns a power transmission device between a heat engine (1) and the wheels (2) of a motor vehicle, said device comprising two independent electric machines (3, 4), at least two planetary gear trains (5, 15, 25, 35; 6, 16, 26, 36) connecting the heat engine and the electric machines with one another and to the vehicle wheels, a mechanical switching device (7) shifting the transmission device from one operating mode to another, each transmission mode corresponding to a different range of transmission ratios, the switching device enabling to connect one of the electric machines directly to the vehicle wheels and a control device monitoring the heat engine (1), the two electric machines (3,4) and the mechanical switching device (7), so that the operating points of the heat engine and of the electric machines correspond to the minimum instantaneous consumption and enable to provide the required power to the wheels.

21 Claims, 5 Drawing Sheets

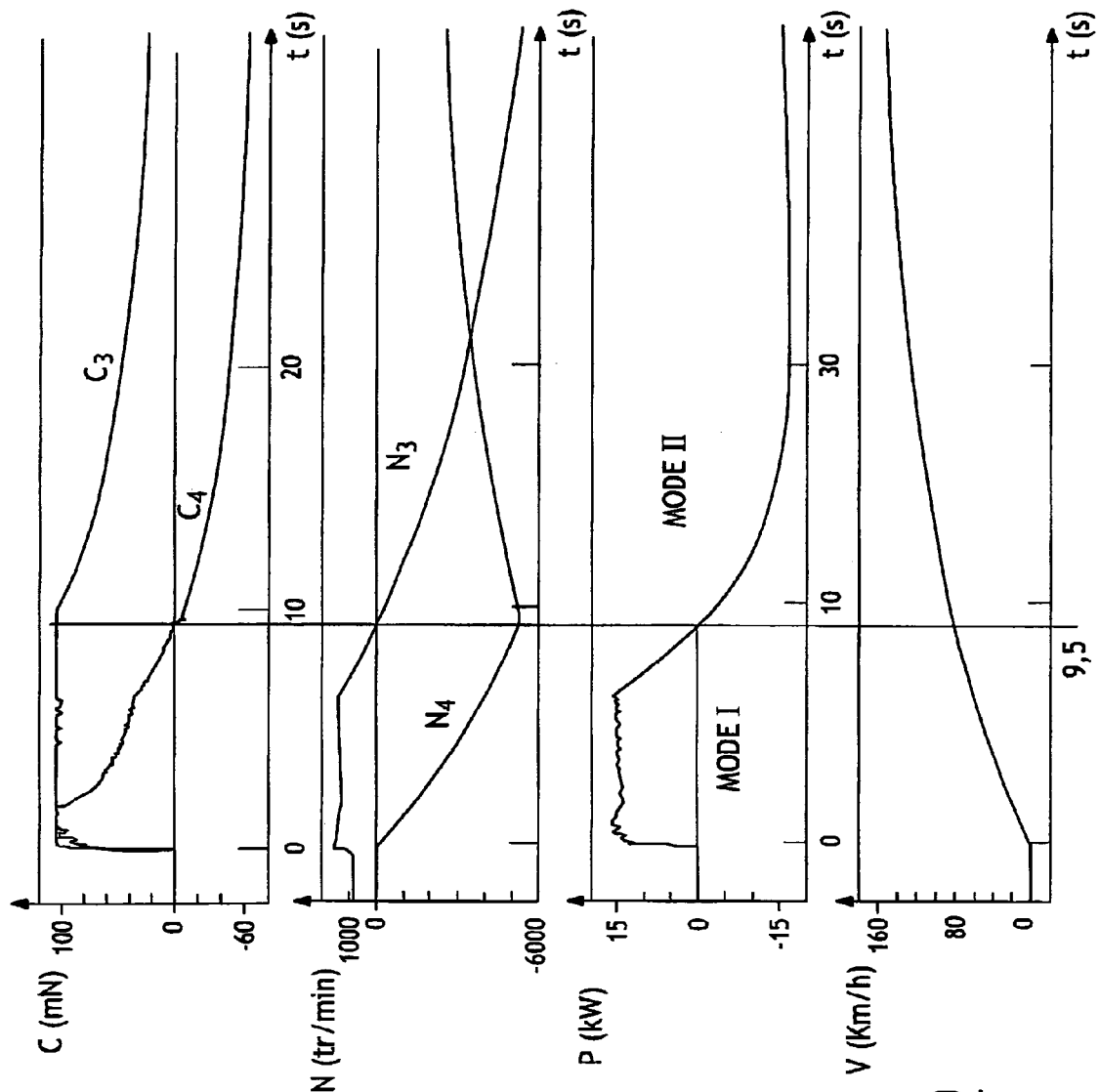

POWER TRANSMISSION DEVICE WITH AT LEAST TWO PLANETARY GEAR TRAINS

Figure 1:
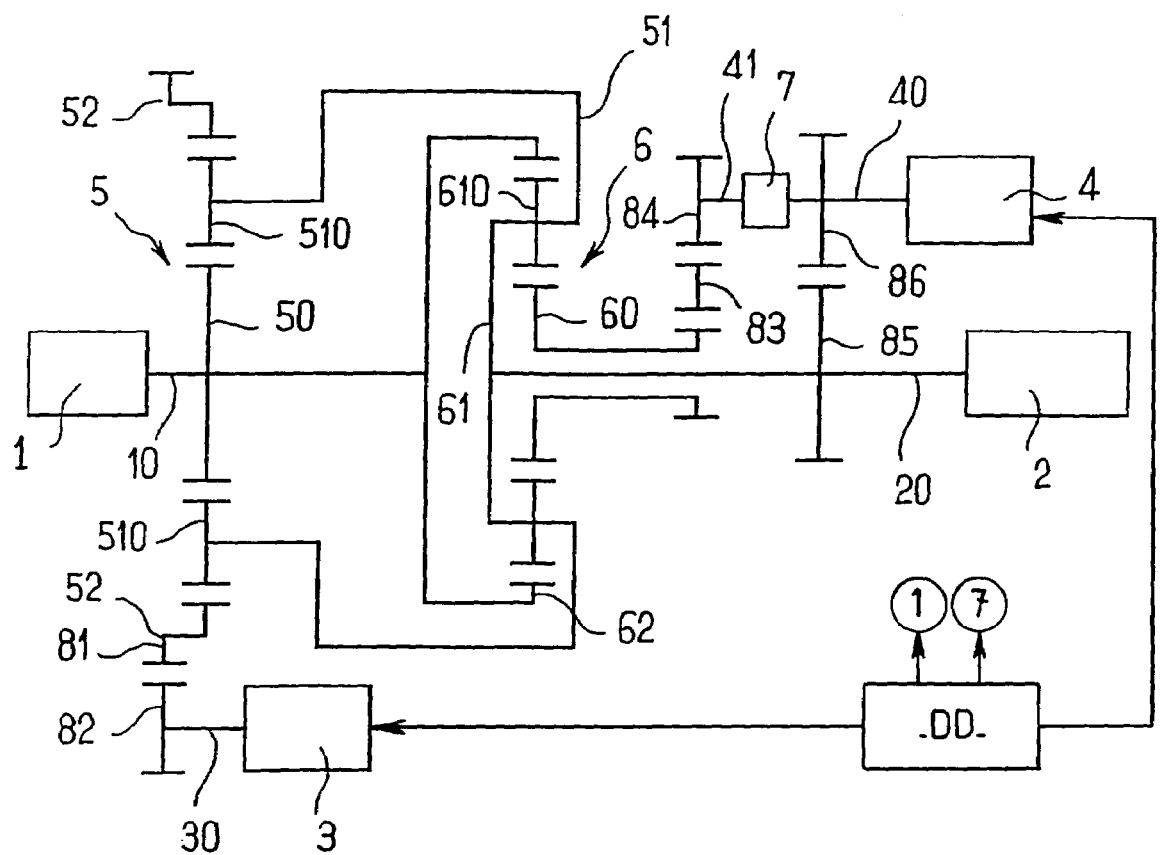

The invention relates to a transmission device for a motor vehicle, intended to ensure the transmission of power between the heat engine and the wheels of the vehicle, while eliminating interruptions in torque.

Transmission members of this type are already known, for example automatic gearboxes or members of the CVT (Continuous Variable Transmission) type or else of the IVT (Infinitely Variable Transmission) type, that is to say a transmission member making it possible to achieve all the transmission ratios contained in a determined interval.

These transmission members make it possible to place the heat engine at its best operating point by matching the transmission ratio to the running conditions.

However, these members all have the drawback of entailing high consumption since they exhibit a gearbox spread that is limited. Moreover, the absence of any interruption in torque is obtained by dissipating energy with loss in the clutches, couplers or hydraulic machines.

A transmission member has already been tailored so as to overcome this drawback, as well to improve longitudinal comfort, as compared with an automatic gearbox or a CVT transmission member, in its startup phase.

This transmission member, used by TOYOTA on the PRIUS vehicle, comprises two electric machines, a planetary gear train by way of which the heat engine and the two electric machines are connected together, as well as a battery. This transmission member operates according to the principle of power tapping which makes it possible to modulate the power transmitted to the wheels.

When the heat engine is operating, part of its power is transmitted directly and mechanically to the wheels of the vehicle, while another part of its power is "tapped off" by way of the two electric machines.

The power tapped off to the electric machines can be transmitted to the battery or else to the wheels of the vehicle.

This transmission member also makes it possible to operate one of the electric machines as a generator, in a slowdown phase, so as to transmit power to the battery.

Such a transmission member makes it possible to obtain all the transmission ratios in a given interval, while reducing consumption by around 40% as compared with a conventional automatic gearbox, in particular by virtue of the absence of any energy-dissipating clutch.

This member has the drawback however of being expensive, in particular owing to the presence of the battery. Moreover, the electric pathway exhibits poor efficiency.

Document EP-1 092 583 describes a power unit for a vehicle which comprises a heat engine, a supervisor, an electromagnetic coupler grouping together two electric machines as well as one, or even two planetary gear trains.

This coupler is designed in a specific manner, the rotor of one machine being carried by the stator of the other machine, the two machines being moreover concentric.

This power unit affords a solution to the problem of the dimensioning of electric machines and to that of electric losses at zero speed of the coupler.

It has drawbacks, however.

Specifically, it firstly requires the design of a specific electromagnetic coupler consisting of two nested electric machines, the cost of which is necessarily high.

Moreover, the link between the two electric machines is established in a mechanical and permanent manner, and not by way of planetary gear trains. This arrangement necessarily limits the available operating modes and hence in particular the possibility of optimizing consumption.

Likewise, the permanent link between the heat engine and the coupler limits the operation of the assembly.

Finally, the switching device comprises dissipative elements such as a band brake or a clutch which necessarily entail losses and does not make it possible to ensure continuity of the torque delivered to the wheels.

Document DE-199 03 936 relates to a transmission device for a motor vehicle equipped with a heat engine, this transmission device comprising two electric machines, each being coupled up to at least one planetary gear train.

A mechanical switching device is also provided.

This device is designed in such a way that the electric machines are not coupled up either to the crankshaft of the heat engine, or to the wheels. These links can be effected only by way of a planetary gear train.

This transmission device has numerous drawbacks.

Specifically, the presence of an intermediate planetary gear train between an electric machine and the wheels requires, during the starting of the vehicle, a considerable torque on an output of the train which must be delivered by the heat engine or by a brake. This is not desirable, especially in terms of consumption.

Moreover, the operation of this transmission device requires the presence of brakes at input and output.

An object of the invention is to improve the known transmission devices for hybrid vehicles by further reducing consumption, overall size and costs, doing so in particular by using standard electric machines and by making the presence of power batteries unnecessary.

The invention therefore relates to a device for power transmission between the heat engine and the wheels of a motor vehicle, the device comprising two independent electric machines, at least two planetary gear trains connecting the heat engine and the electric machines together and to the wheels of the vehicle, a mechanical switching device providing for the shift from one mode of operation of the transmission device to another, each mode of transmission corresponding to a different range of transmission ratios, the switching device making it possible to connect one of the electric machines directly to the wheels of the vehicle and a drive device controlling the heat engine, the two electric machines and the mechanical switching device, in such a way that the operating points of the heat engine and of the electric machines correspond to the minimum instantaneous consumption and make it possible to obtain the requested power at the wheels.

This transmission device makes it possible to reduce consumption by virtue of the presence of more than one planetary gear train, thereby making it possible to reduce the electric power tapped off.

Preferably, the mechanical switching device includes no dissipative element and makes it possible to limit or eliminate jerks when shifting from one mode of operation to another.

Thus, the transmission device then allows a further reduction in consumption.

According to the invention, the mechanical switching device is placed between one of the two electric machines and the remainder of the transmission device.

Preferably, the mechanical switching device allows the choice between two different modes of operation.

In a preferred embodiment of the invention, the transmission device comprises two planetary gear trains whose three shafts are free in rotation with respect to the body of the vehicle and to the casing of the engine.

In a first variant, the two planet gear carriers are connected together and to the wheels.

One of the electric machines can then be connected, by way of the mechanical switching device, either to the wheels of the vehicle, or to the sun gear of one of the two planetary gear trains.

In a second variant, the planet gear carrier of the first planetary gear train is connected to the ring gear of the second planetary gear train and to the wheels.

One of the electric machines can then be connected, by way of the switching device, either to the ring gear, or to the sun gear of the second planetary gear train.

In a third variant, the ring gear of the first planetary gear train is connected to the planet gear carrier of the second planetary gear train and to the wheels.

One of the electric machines can then be connected, by way of the switching device, either to the sun gear of the first planetary gear train, or to the planet gear carrier of the second planetary gear train.

In a fourth variant, the sun gear of the first train is connected to the ring gear of the second train and to the wheels.

One of the electric machines can then be connected, by way of the switching device, either to the sun gear, or to the planet gear carrier of the first planetary gear train.

Moreover, the ratios of the two planetary gear trains are chosen in such a way that, when the speed of the output shaft of said electric machine is equal to the speed of the sun gear of said planetary gear train, the speed of the output shaft of the other electric machine is zero.

Preferably, the mechanical switching device with no dissipative element is a jaw clutch.

The invention also relates to a process for transmitting power between the heat engine and the wheels of a motor vehicle, by means of two independent electric machines, of at least two planetary gear trains connecting the heat engine and the electric machines together, and of a mechanical switching device making it possible to connect one of the electric machines to the wheels of the vehicle, this process consisting in determining the transmission ratio, in commanding the switching device so as to ensure the transmission according to the mode corresponding to said ratio and in controlling the heat engine and the two electric machines, in such a way that the operating points of the heat engine and of the electric machines correspond to the minimum instantaneous consumption and make it possible to obtain the requested power at the wheels.

Preferably, the mechanical switching device includes no dissipative element.

According to the invention, the shift from one mode of operation to the other is performed when the speed of the output shaft of the electric machine connected to the mechanical switching device is equal to the speed of the shaft connecting this mechanical switching device to the remainder of the transmission device.

Preferably, the shift from one mode of operation to the other is performed when the power tapped off from the two electric machines is zero, so as to avoid an abrupt variation in torque.

The invention also relates to a motor vehicle equipped with a power transmission device as described above.

This motor vehicle can comprise a power battery.

Figure 2:
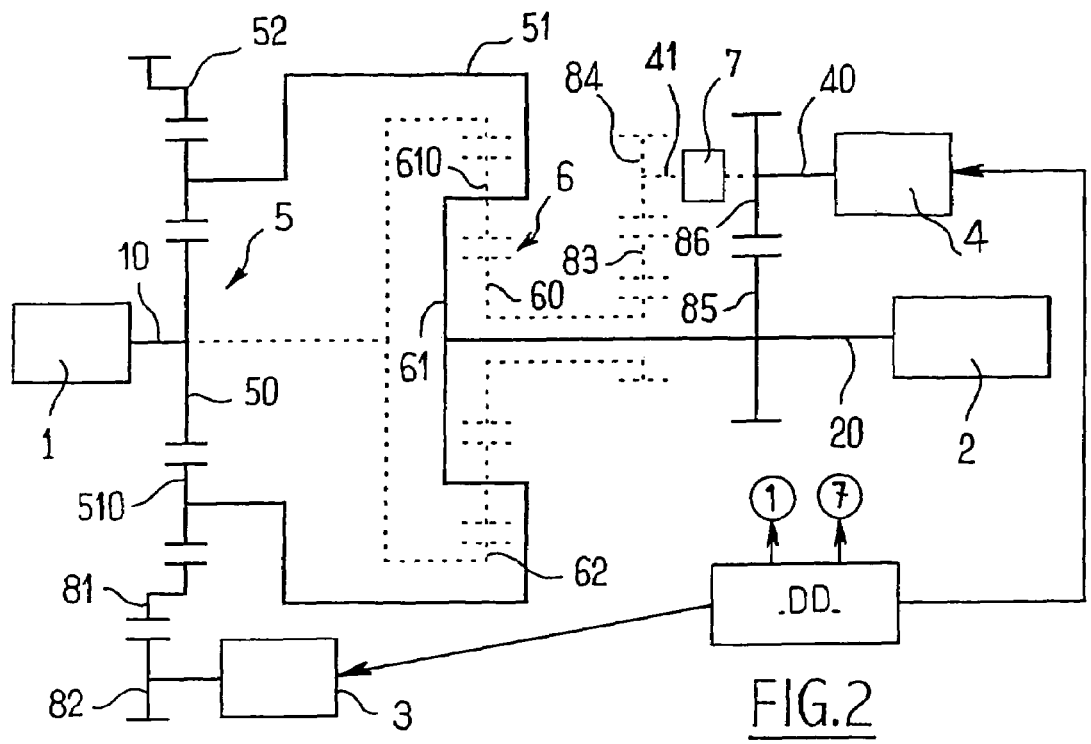
Figure 3:
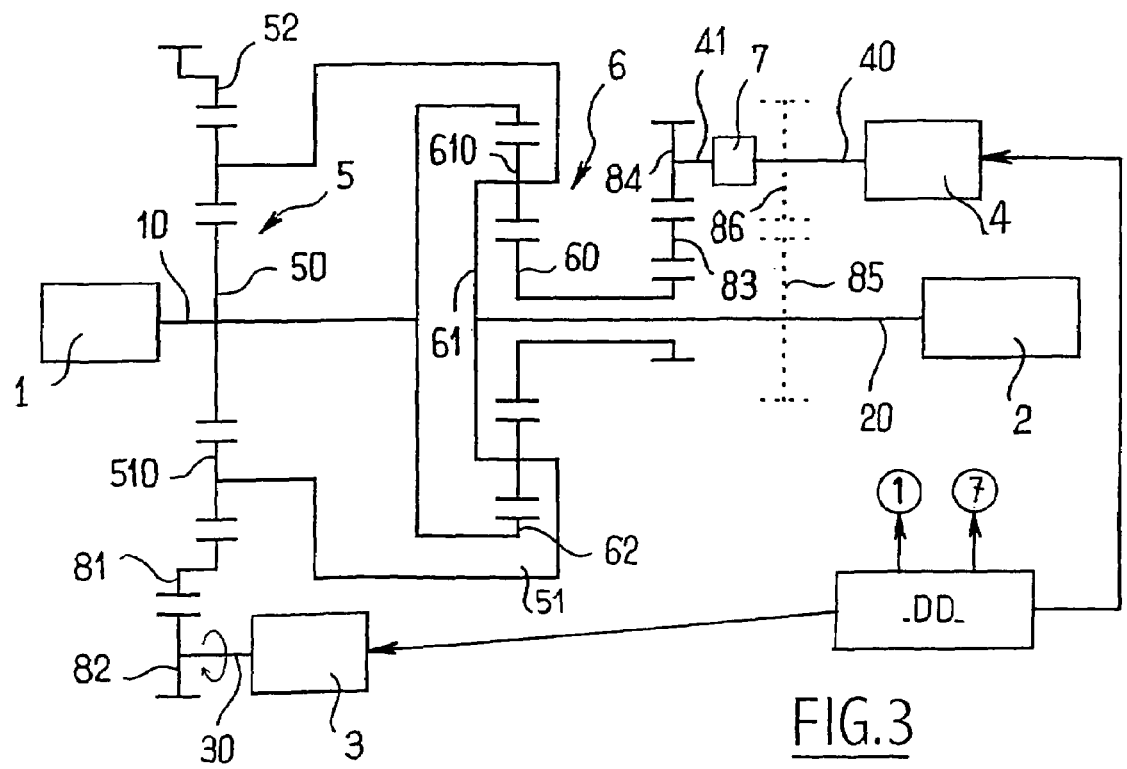
Figure 4:
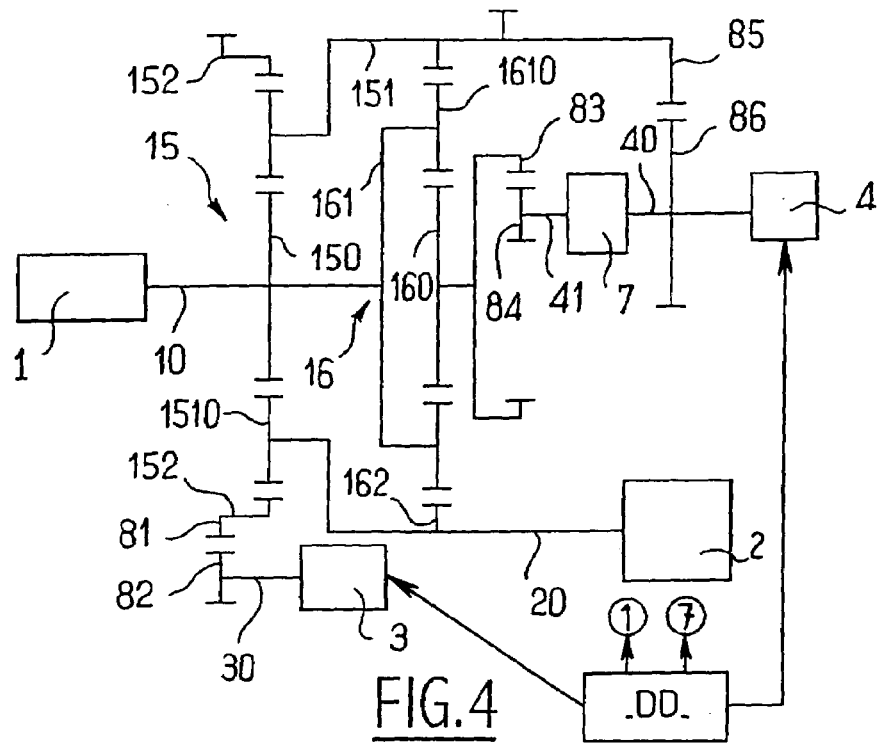
Figure 5:
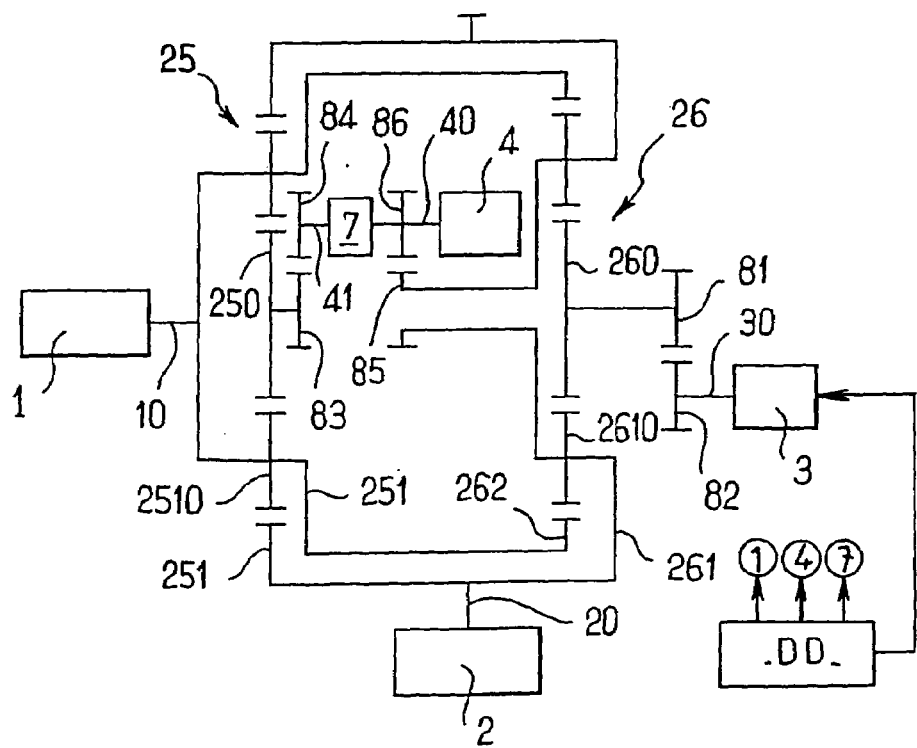
Figure 6:
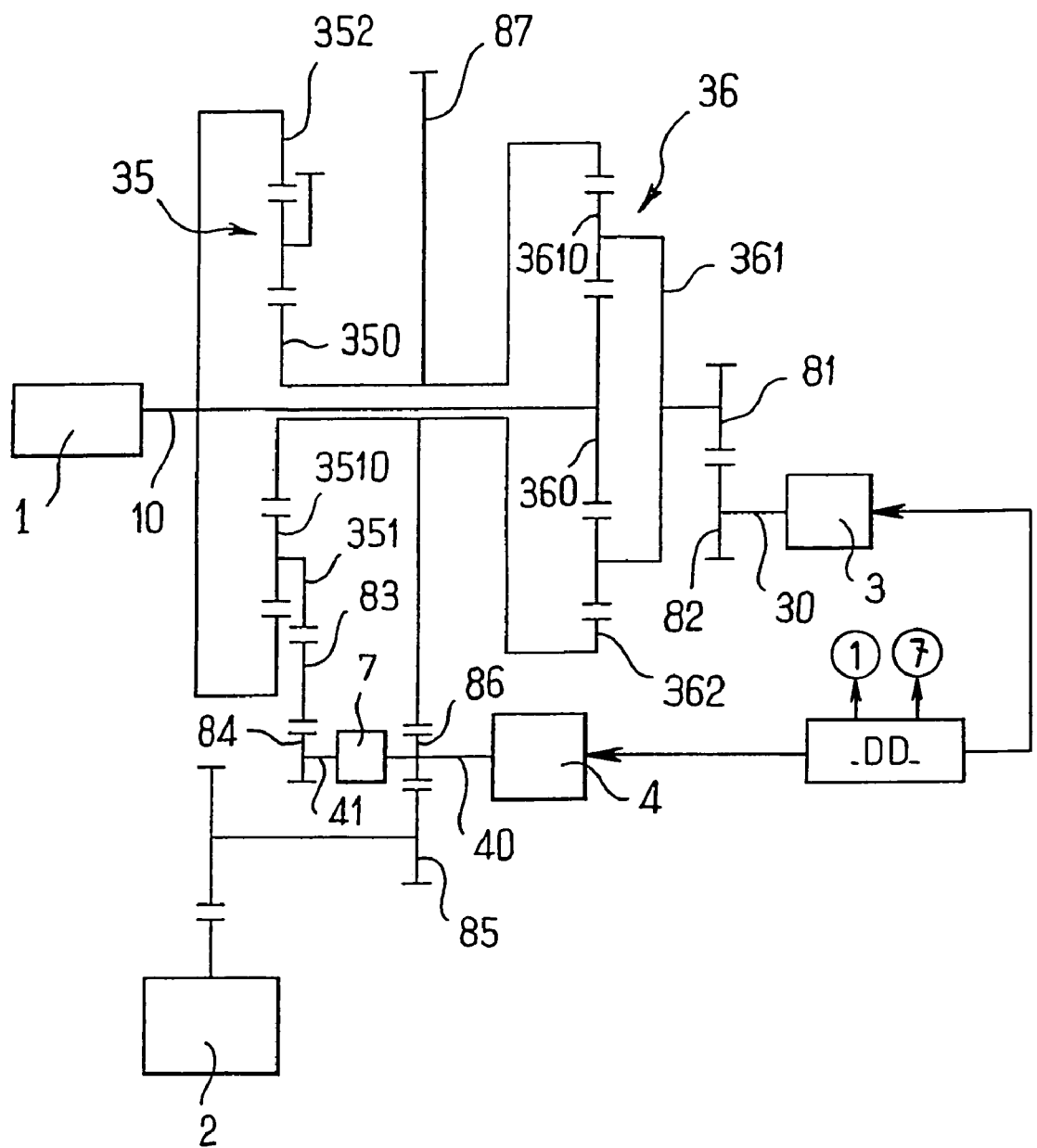

The invention will be better understood and other aims, advantages and characteristics thereof will become more clearly apparent on reading the description which follows and which is given with regard to the appended drawings in which:

FIG. 1 is a diagrammatic view representing a first exemplary embodiment of a transmission device according to the invention comprising two planetary gear trains, FIG. 2 is a diagram illustrating the operation of the transmission device of FIG. 1, in a first mode, FIG. 3 is a diagram illustrating the operation of the device of FIG. 1, in a second mode FIG. 4 is a diagrammatic view representing a second exemplary embodiment of a transmission device according to the invention, FIG. 5 is a diagrammatic view representing a third exemplary embodiment of a transmission device according to the invention, FIG. 6 is a diagrammatic view representing a fourth exemplary embodiment of a transmission device according to the invention and FIGS. 7 to 10 which give, for the first exemplary embodiment of a transmission device according to the invention and during acceleration of the motor vehicle, the time dependent profile, respectively of the torque of each electric machine, ($C_3$, $C_4$), of the rate of each machine ($N_3$, $N_4$), of the electric power tapped off (P) and of the speed of the vehicle.

The elements common to the various figures will be designated by the same references.

The transmission device illustrated in FIG. 1 is intended for a motor vehicle comprising a heat engine 1. The wheels of the vehicle are referenced 2.

The transmission device comprises two electric machines 3 and 4.

The heat engine 1 and the electric machines 3 and 4 are connected together by way of two planetary gear trains 5 and 6.

The planetary gear train 5 is connected by way of its sun gear 50 to the output shaft 10 of the heat engine 1.

Its planet gear carrier 51 is connected to the output shaft 20 connected to the wheels 2. The planet gears bear the reference 510.

Finally, the electric machine 3 meshes with the ring gear 52 of the first train 5 by way of the toothed wheels 81 and 82. The machine 3 is connected to the toothed wheel 81 by its output shaft 30.

The output shaft 10 of the heat engine 1 is also connected to the ring gear 62 of the second train 6.

The planet gear carrier 61 is connected to the planet gear carrier 51 and to the output shaft 20. The planet gears bear the reference 610.

Finally, the sun gear 60 of the second train 6 can be connected to the electric machine 4, by means of a mechanical switching device 7 represented very diagrammatically in FIG. 1, and by way of the shafts 40 and 41 of the toothed wheels 83 and 84.

Preferably, this mechanical switching device comprises no dissipative elements. It may in particular take the form of a dog jaw clutch.

Finally, the electric machine 4 can also be connected, still by way of the mechanical switching device 7, to the output shaft 20, by way of the toothed wheels 85 and 86.

Thus, in this transmission device, the mechanical switching device 7 is placed between one of the two electric machines 4 and the remainder of the transmission device. In practice, this transmission device takes the form of a single jaw clutch.

Moreover, the two planetary gear trains 5 and 6 are designed in such a way that the two planet gear carriers 51 and 61 are connected together and to the wheels.

Thus, the link between the heat engine and the electric machines and between the electric machines is effected by way of the two planetary gear trains.

In particular, there is no fixed link between the heat engine and one or the other of the electric machines, so as to have great flexibility in the choice of operating modes.

The operation of the transmission device will now be described firstly with reference to FIG. 2 which illustrates a first mode of operation.

This first mode of operation is used for relatively low transmission ratios. They may in particular correspond to a speed of between 0 and 15 kilometres/hour (output shaft 20 connected to the wheels) for a speed of the heat engine 1 of 1000 rpm.

This first mode of operation is therefore used in particular during the starting of the vehicle.

In this mode of operation, the electric machine 4 is connected, by way of the toothed wheels 85 and 86, to the output shaft 20, constituting the secondary shaft of the transmission. The switching device 7 is actuated in an appropriate manner such that the toothed wheel 86 is engaged on the shaft 40.

The electric machine 4 is thus directly engaged with the output shaft 20 and hence the wheels of the vehicle. This direct link is effected without losses. Moreover, it allows an electric machine to generate a considerable torque at the level of the wheels with a machine of relatively small dimensions.

The second planetary gear train 6 is represented by dashes in FIG. 2. Specifically, the ring gear 62 of this train 6 is driven well by the heat engine 1, but does not transmit power to the wheels since it is not connected to the output shaft 20.

Thus, the toothed wheel 86 drives the output shaft 20 connected to the wheels 4, by way of the toothed wheel 85, whereas the toothed wheel 84 is idling.

In this mode of operation, the speed of the output shaft 20 is equal to the speed of the planet gear carriers 51 and 61 of the two planetary gear trains.

When the vehicle is under traction, that is to say when the heat engine is delivering power to the wheels, the electric machine 3 operates as an alternator while the electric machine 4 is a motor. When the vehicle is in recovery, that is to say the wheels are driving the heat engine in rotation, the electric machine 3 operates as a motor and the electric machine 4 as an alternator.

A link device, not illustrated in the figures, ensures the shifting of power between the two electric machines.

Such a link device is described in particular in the document FR-00 09461.

It may also be noted that the transmission device is used according to the first mode of operation, when the vehicle is reversing.

Reference is now made to FIG. 3 which illustrates a second mode of operation of the transmission device illustrated in FIG. 1.

This second mode of operation is used for relatively long transmission ratios, corresponding for example to a speed of the output shaft of between 15 and 60 kilometres/hour for a speed of the heat engine of 1000 rpm.

This second mode of operation is used when the vehicle is travelling forwards, after startup.

In this second mode of operation, the mechanical switching system 7 is instructed in such a way as to connect the electric machine 4 to the toothed wheel 84, then engaged with the shaft 41, the wheel 86 then idling. The shafts 40 and 41 are then tied in rotation by way of the device 7.

The wheels 85 and 86 are represented by dashes in FIG. 3 to illustrate the fact that they do not transmit power to the wheels.

The electric machine 4 then meshes with the sun gear 60 of the second planetary gear train 6, by way of the wheels 84 and 83.

Moreover, the heat engine 1 is still connected to the sun gear 50 of the first planetary gear train 5 and the electric machine 3 still meshes with the ring gear 52 of this first train, by way of the wheels 81 and 82.

As explained previously for the first mode of operation, the electric machines 3 and 4 can operate as a motor or alternator, as the case may be.

A drive device, not illustrated in the figures, controls the heat engine and the two electric machines by determining their operating point and also controls the mechanical switching device 7 in the following manner.

On the basis of charts of instantaneous consumption of the heat engine as well as charts of efficiency of the electric machines, the drive device determines the operating point of the heat engine and of the electric machines which corresponds to the minimum instantaneous consumption and which ensures that the torque obtained at the wheels does indeed correspond to what the driver requires.

If the drive device detects a minimum consumption for a relatively low transmission ratio, the power transmission device is used according to the first mode of operation and, in this case, the mechanical switching device 7 is instructed in such a way that the wheel 86 is locked to the output shaft 40 of the electric machine 4. Otherwise, the transmission device is used in the second mode of operation and the mechanical switching device 7 is then instructed in such a way that the output shaft 40 of the electric machine 4 is connected to the wheel 84, hence locked to the shaft 41.

In practice, the shift from one mode of operation to another is effected when the speed of the output shaft 40 of the electric machine 4 is equal to the speed of the shaft 41 connecting the switching device 7 to the toothed wheel 84. The continuity of the rates is necessary in order for the switching device to be able to operate.

To within the reduction ratio, due to the presence of the toothed wheels 83 and 84, this condition is also achieved when the speed of the output shaft 40 of the electric machine 4 is equal to the speed of the sun gear 60 of the planetary gear train 6.

When shifting from mode of operation to another, the torque on the output shaft 20 decreases, thereby generating an abrupt jerk.

Several solutions may be envisaged for limiting or eliminating this jerk during a change of operating mode.

Provision may in particular be made for the drive device to instruct the electric machine 3 appropriately, during a change of operating mode, so that this machine delivers a bigger torque for a determined duration, to compensate for the absence of torque originating from the electric machine 4.

Another solution consists in choosing the ratios of the planetary gear trains 5 and 6 in such a way that when the continuity condition on the rates is fulfilled, the speed of the output shaft 30 of the electric machine 3 is zero.

This condition is also manifested by the fact that the power tapped from the two electric machines 3 and 4 is zero.

The stopping of the electric machine 3 during the change of rate makes it-possible to minimize the torque delivered by the electric machine 4. This torque is not zero however, owing to the losses in the electric machines and to the consumption in the onboard network.

This condition being achieved, provision may be made for the drive device to instruct the heat engine and/or the electric machine 3 appropriately in such a way as to generate a slightly bigger torque so as to ensure the continuity of the torque delivered to the wheels.

By applying the WILLIS relation to each of the two planetary gear trains, the stopping of the electric machine 3 during a change of operating mode is manifested by the following condition:

$$[r_3/(r_2 R_2)-(R_2+1)/R_1+(R_1+1)]=0$$

with:

$r_3 = Z_4/Z_3$ where $Z_3$ and $Z_4$ are respectively the number of teeth of the toothed wheels 83 and 84, $r_2 = Z_6/Z_5$ where $Z_5$ and $Z_6$ are respectively the number of teeth of the toothed wheels 85 and 86, $R_2$ is the ratio of the planetary gear train 6, $R_1$ is the ratio of the planetary gear train 5.

The presence of an additional planetary gear train, as compared with the known transmission devices with a single planetary gear train, makes it possible to operate the transmission device according to an additional mode of operation.

This additional mode of operation makes it possible to operate the heat engine and the electric machines with better efficiency, in a bigger range of transmission ratios.

This is manifested by the fact that the electric power tapped off by way of the two electric machines decreases.

By way of example, as compared with a conventional transmission member, for which the maximum power tapped off is of the order of 50 kW, this power tapped off is of the order of 17 kW for a transmission device such as described above, this being so for equivalent performance.

Thus, the transmission device according to the invention makes it possible to ensure the continuity of the torque at the wheels and hence to eliminate jerks, while delivering the power requested to the wheels with minimum consumption.

By way of illustration of the advantages afforded by the transmission device according to the invention, FIGS. 7 to 10 show the time dependent profile of the torque and of the rate of each of the two electric machines, as well as the time dependent profile of the power tapped off and of the speed of the vehicle, during acceleration of the vehicle.

At the time t=0 up to the time t=9.5 seconds, it is the first mode of operation described with reference to FIG. 2 which is used.

The shift to the second mode of operation is carried out at t=9.5 seconds, while the rate of the electric machine 3 ($N_3$) is zero and the torque delivered by the electric machine 4 ($C_4$) is zero. At that instant, the power tapped off from the two electric machines 3 and 4 (P) is likewise zero.

FIGS. 7 to 10 show that the transmission device according to the invention ensures continuity of the torque and of the rate of each of the two electric machines.

It ensures considerable longitudinal dynamics with electric machines whose dimensional sizes are moderate by virtue of the substantial adaptability afforded by the mechanical part.

Other exemplary embodiments of the switching device according to the invention are illustrated in FIGS. 4 to 6.

Of course, the invention is not limited to a transmission device comprising two planetary gear trains. It would also be possible to envisage a power transmission device comprising three planetary gear trains, or even more. The number of planetary gear trains is essentially limited by cost reasons.

In the second exemplary embodiment illustrated in FIG. 4, the heat engine 1 and the electric machines 3 and 4 are connected together by way of two planetary gear trains 15 and 16.

The planetary gear train 15 is connected by way of its sun gear 150 to the output shaft 10 of the heat engine.

Its planet gear carrier 151 is connected to the ring gear 162 of the second planetary gear train 16 and to the output shaft 20 connected to the wheels 2. The planet gears bear the reference 1510.

The electric machine 3 meshes with the ring gear 152 of the first planetary gear train 15 by way of the toothed wheels 81 and 82. The machine 3 is connected to the toothed wheel 82 by its output shaft 30.

The output shaft 10 of the heat engine 1 is likewise connected to the planet gear carrier 161 of the second planetary gear train 16. The planet gears bear the reference 1610.

The ring gear 162, of the second planetary gear train 16 can likewise be connected to the electric machine 4, by means of the mechanical switching device 7 and by way of the shaft 40 of the electric machine 4 and of the toothed wheels 85 and 86.

Finally, the sun gear 160 of the second planetary gear train can likewise be connected to the electric machine 4, by means of the mechanical switching device 7 and by way of the shafts 40 and 41 and of the toothed wheels 83 and 84.

As in the first exemplary embodiment, the mechanical switching device is placed between one of the two electric machines and the remainder of the transmission device. It is composed, for example, of a single jaw clutch.

In the third exemplary embodiment illustrated in FIG. 5, the heat engine 1 and the electric machines 3 and 4 are connected together by way of two planetary gear trains 25 and 26.

The first planetary gear train 25 is connected by way of its planet gear carrier 251 to the output shaft 10 of the heat engine 1 and to the ring gear 262 of the second planetary gear train 26. The planet gears bear the reference 2510.

Its sun gear 250 can be connected to the electric machine 4 by means of the mechanical switching device 7 and by way of the shafts 40 and 41 and of the toothed wheels 83 and 84.

The ring gear 252 of the first planetary gear train 25 is connected to the planet gear carrier 261 of the second planetary gear train 26 and to the output shaft 20 connected to the wheels 2. The planet gears bear the reference 2610.

It may also be connected to the electric machine 4, by means of the mechanical switching device 7 and by way of the toothed wheels 85 and 86.

Finally, the sun gear 260 of the second planetary gear train 26 is connected to the electric machine 3 by way of the toothed wheels 81 and 82 and of the output shaft 30.

Here again, the mechanical switching device is placed between one of the two electric machines and the remainder of the transmission device and may then be constituted by a single jaw clutch.

With reference now to FIG. 6, the heat engine 1 and the electric machines 3 and 4 are connected together by way of two planetary gear trains 35 and 36.

The first planetary gear train 35 is connected by way of its sun gear 350 to the ring gear 362 of the second planetary gear train 36.

Through its sun gear 350, the train 35 can also be connected to the electric machine 4, by means of the switching device 7 and by way of the toothed wheels 85 and 86.

In this case, the electric machine 4 drives the wheels 2 directly.

The ring gear 352 of the train 35 is connected to the output shaft 10 of the heat engine 1, which is also connected to the sun gear 360 of the second planetary gear train 36.

Moreover, the planet gear carrier 351 of the train 35 can be connected to the electric machine 4, by means of the mechanical switching device 7 and by way of the toothed wheels 83 and 84 and of the shafts 40 and 41. The planet gears bear the reference 3510.

In this case, the electric machine 4 serves as variator motor for the first train 35 and the power is transmitted to the wheels by the toothed wheels 85, 86 and 87.

The planet gear carrier 361 of the second planetary gear train 36 is connected to the electric machine 3 by way of the toothed wheels 81 and 82 and of the shaft 30. The planet gears bear the reference 3610.

Here again, the switching device 7 is placed between one of the two electric machines and the remainder of the transmission device. In practice, it may take the form of a jaw clutch.

In all the embodiments described, the planetary gear trains make it possible to connect together the electric machines and also the heat engine.

There are no fixed links that could limit the choice of operating modes.

In all cases, the three shafts of the planetary gear trains are free in rotation with respect to the body of the vehicle and to the casing of the engine. This has the advantage of providing a large number of possible combinations for optimizing the dimensional sizing of the electric machines.

Moreover, the electric machines used are independent and may be standard machines, of simple construction and whose manufacturing costs are optimized, like those intended for air-conditioning compressors or pumps.

With each planetary gear train may be associated a particular mode of operation of the power transmission device.

As described above, the transmission device comprises mechanical elements other than the planetary gear trains, such as for example toothed wheels catering only for the transmission of movements. However, it does not require elements such as brakes to cater for the operation of the device in all modes.

Moreover, the use of a mechanical switching device, with no dissipative element, also makes it possible to reduce consumption.

In the exemplary embodiments described, the switching device is disposed between an electric machine and the remainder of the transmission device.

Thus, the switching device can in particular take the form of a single jaw clutch. The control software associated with the drive device is therefore designed to control just one jaw clutch and it is necessarily a simpler design than software driving several jaw clutches.

Moreover, in this configuration, the switching device offers the choice between two different modes of operation.

This power transmission device can be used with a motor vehicle comprising or not comprising a battery.

The presence of a battery has the benefit of reducing consumption when the vehicle is operating at low power.

However, a battery has drawbacks especially in terms of bulkiness and cost. It is thus possible to choose not to make provision for one.

In practice, and independently of the transmission device, the presence of batteries is determined according to the driving strategy chosen during the design of the vehicle.

In this case, a link device ensures direct shifting of power between the two electric machines, the electric machines being controlled in such a way that the power generated by one electric machine is immediately consumed by the other.

Such a link device is described in particular in the document FR-00 09461.

The reference signs inserted after the technical characteristics featured in the claims have the sole aim of facilitating their understanding and shall not limit the scope thereof.

The invention claimed is:

1. A device for power transmission between a heat engine (1) and wheels (2) of a motor vehicle, the device comprising two independent electric machines (3, 4), at least two planetary gear trains (5, 15, 25, 35; 6, 16, 26, 36) connecting the heat engine and the electric machines together and to the wheels of the vehicle, a mechanical switching device (7) providing for the shift from one mode of operation of the transmission device to another, each mode of transmission corresponding to a different range of transmission ratios, the switching device (7) making it possible to connect one of the electric machines (4) directly to the wheels (2) of the vehicle and a drive device controlling the heat engine (1), the two electric machines (3, 4) and the mechanical switching device (7), in such a way that the operating points of the heat engine and of the electric machines correspond to the minimum instantaneous consumption and make it possible to obtain the requested power at the wheels.

2. The power transmission device as claimed in claim 1, characterized in that the mechanical switching device (7) includes no dissipative element and makes it possible to limit or eliminate jerks when shifting from one mode of operation to another.

3. The power transmission device as claimed in claim 1 or claim 2, in which the mechanical switching device (7) is placed between one of the two electric machines (4) and the remainder of the transmission device.

4. The power transmission device as claimed in claim 1, in which the mechanical switching device allows the choice between two different modes of operation.

5. The power transmission device as claimed in claim 1, comprising two planetary gear trains (5, 6; 15, 16; 25, 26; 35, 36) whose three shafts are free in rotation with respect to the body of the vehicle and to the casing of the engine.

6. The power transmission device as claimed in claim 5, in which the two planet gear carriers (51, 61) for said two planetary gear trains (5, 6; 15, 16; 25, 26; 35, 36) are connected together and to the wheels (2).

7. The power transmission device as claimed in claim 6, in which one of the electric machines (4) can be connected, by way of the mechanical switching device (7), either to the wheels (2) of the vehicle, or to a sun gear (60) of one of the two planetary gear trains (6).

8. The power transmission device as claimed in claim 5, in which a planet gear carrier (151) of the first planetary gear train (15) is connected to a ring gear (162) of the second planetary gear train (16) and to the wheels (2).

9. The power transmission device as claimed in claim 8, in which one of the electric machines (4) can be connected, by way of the switching device (7), either to the ring gear (162), or to a sun gear (160) of the second planetary gear train (6).

10. The power transmission device as claimed in claim 5, in which a ring gear (252) of the first planetary gear train (25) is connected to a planet gear carrier (261) of the second planetary gear train (26) and to the wheels (2).

11. The power transmission device as claimed in claim 10, in which one of the electric machines (4) can be connected, by way of the switching device (7), either to a sun gear (250) of the first train (25), or to the planet gear carrier (261) of the second train (26).

12. The power transmission device as claimed in claim 5, in which a sun gear (350) of the first train (35) is connected to a ring gear (362) of the second train (36) and to the wheels (2).

13. The power transmission device as claimed in claim 12, in which one of the electric machines (4) can be connected, by way of the switching device (7), either to the sun gear (350), or to a planet gear carrier of the first planetary gear train (35).

14. The power transmission device as claimed in claim 5, in which the ratios of the two planetary gear trains (5; 6) are chosen in such a way that, when the speed of the output shaft (40) of said electric machine (4) is equal to the speed of a sun gear (60) of said planetary gear train (6), the speed of an output shaft (30) of the other electric machine (3) is zero.

15. The power transmission device as claimed in claim 2, in which the mechanical switching device (7) is a jaw clutch.

16. A process for transmitting power between a heat engine (1) and wheels (2) of a motor vehicle, by means of two independent electric machines (3, 4), of at least two planetary gear trains (5, 15, 25, 35; 6, 16, 26, 36) connecting the heat engine and the electric machines together, and of a mechanical switching device (7) making it possible to connect one of the electric machines (4) to the wheels (2) of the vehicle, this process consisting in determining the transmission ratio, in commanding the switching device so as to ensure the transmission according to the mode corresponding to said ratio and in controlling the heat engine and the two electric machines, in such a way that the operating points of the heat engine and of the electric machines correspond to the minimum instantaneous consumption and make it possible to obtain the requested power at the wheels.

17. The process as claimed in claim 16, characterized in that the mechanical switching device includes no dissipative element.

18. The process as claimed in claim 16 or claim 17, in which the shift from one mode of operation to the other is performed when the speed of the output shaft (40) of the electric machine (4) connected to the mechanical switching device is equal to the speed of a shaft (41) connecting moreover this mechanical switching device to the remainder of the transmission device.

19. The process for transmitting power as claimed in claim 18, in which the shift from one mode of operation to the other is performed when the power tapped off from the two electric machines is zero, so as to avoid an abrupt variation in torque.

20. A motor vehicle equipped with a power transmission device as claimed in claim 1.

21. The motor vehicle as claimed in claim 20 comprising a power battery.

* * * * *